United States Patent Office 2,740,947
Patented Apr. 3, 1956

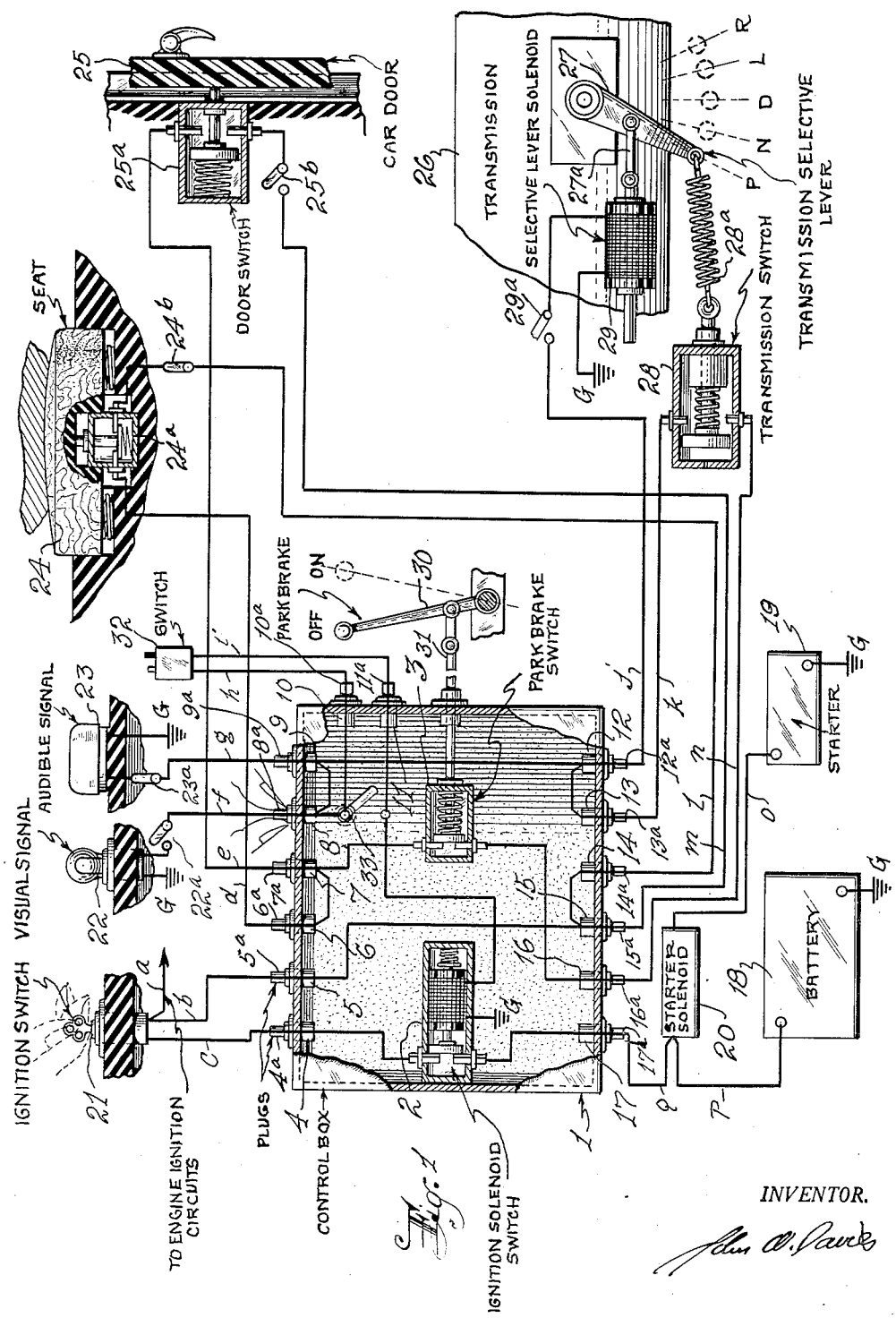

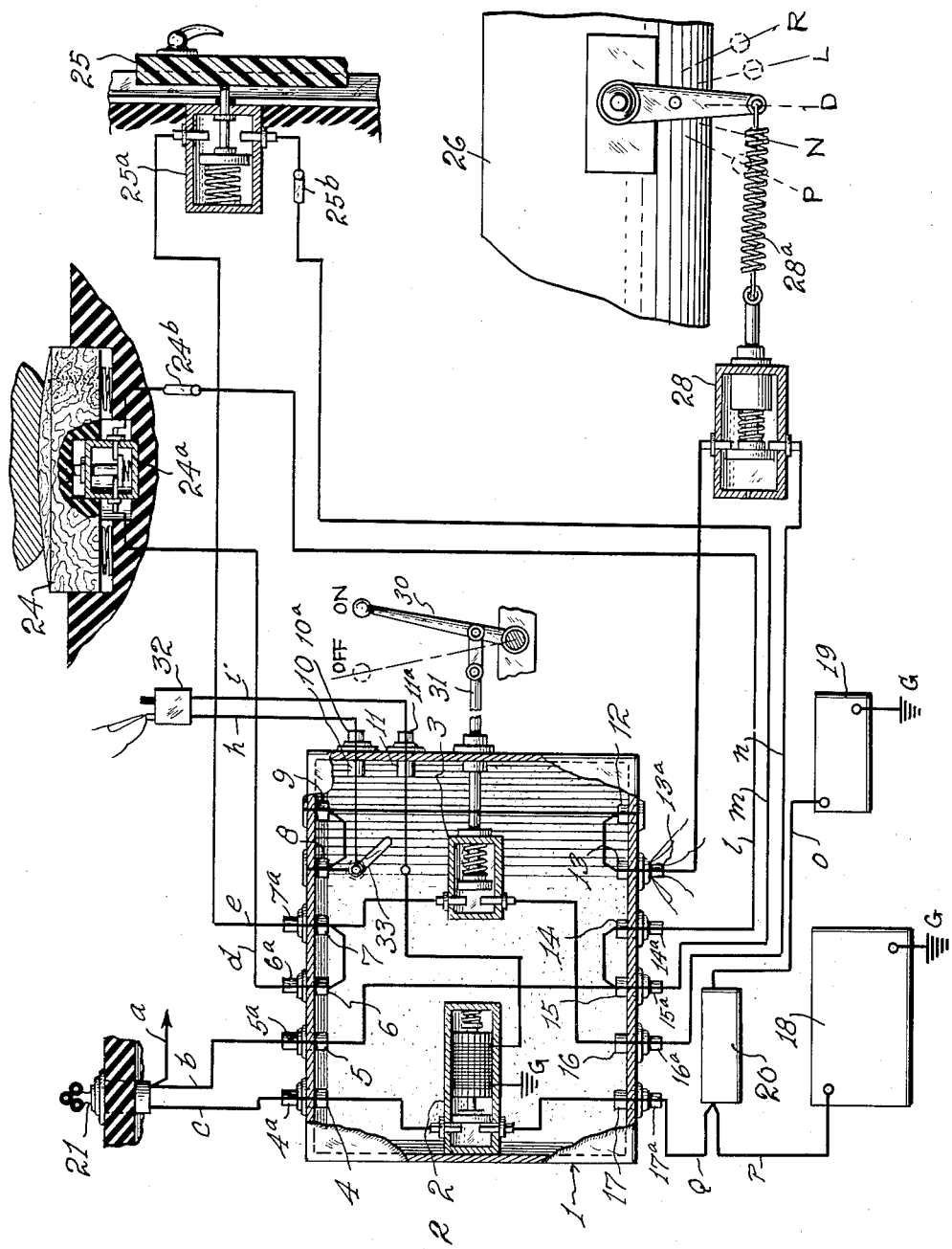

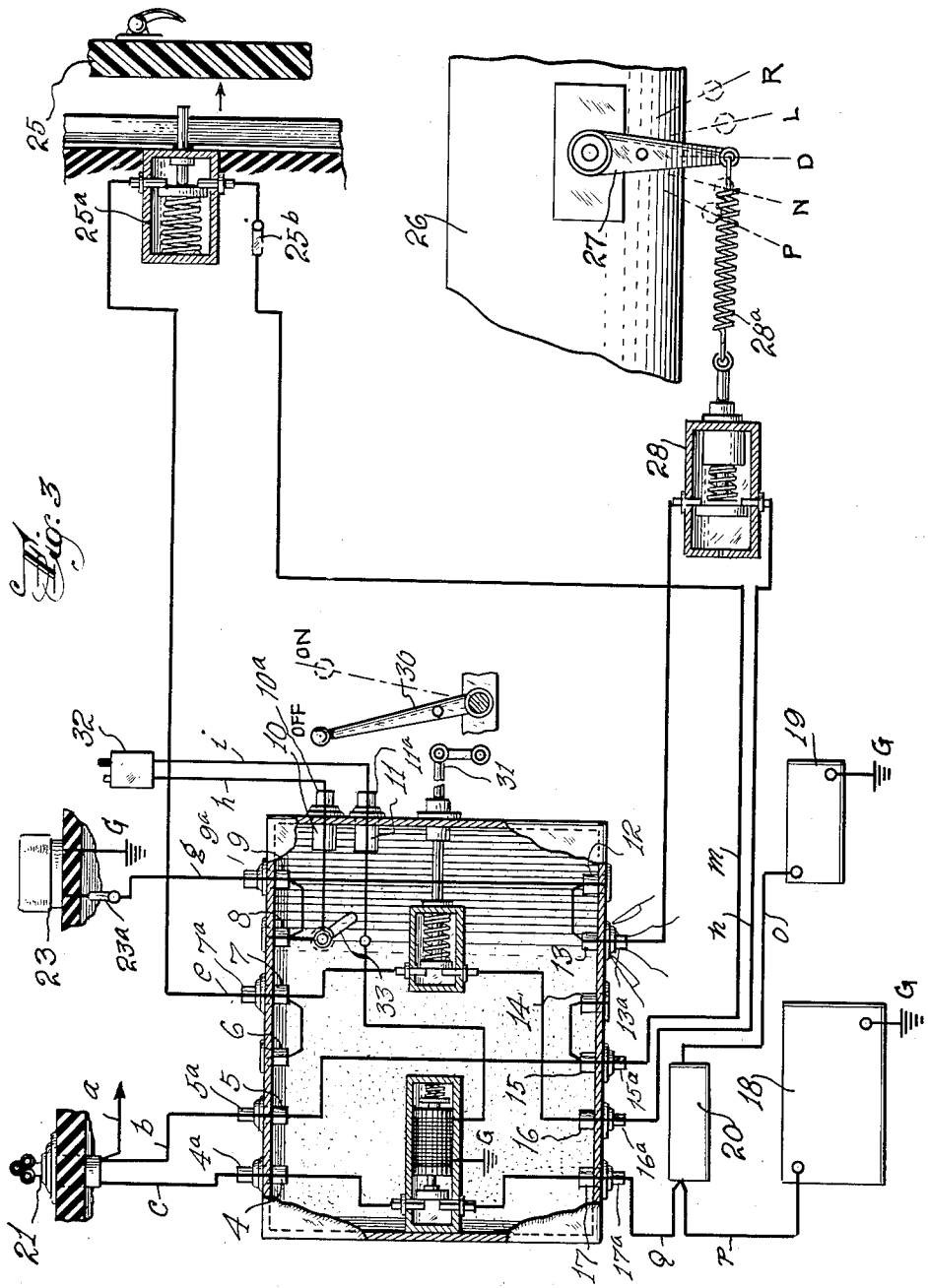

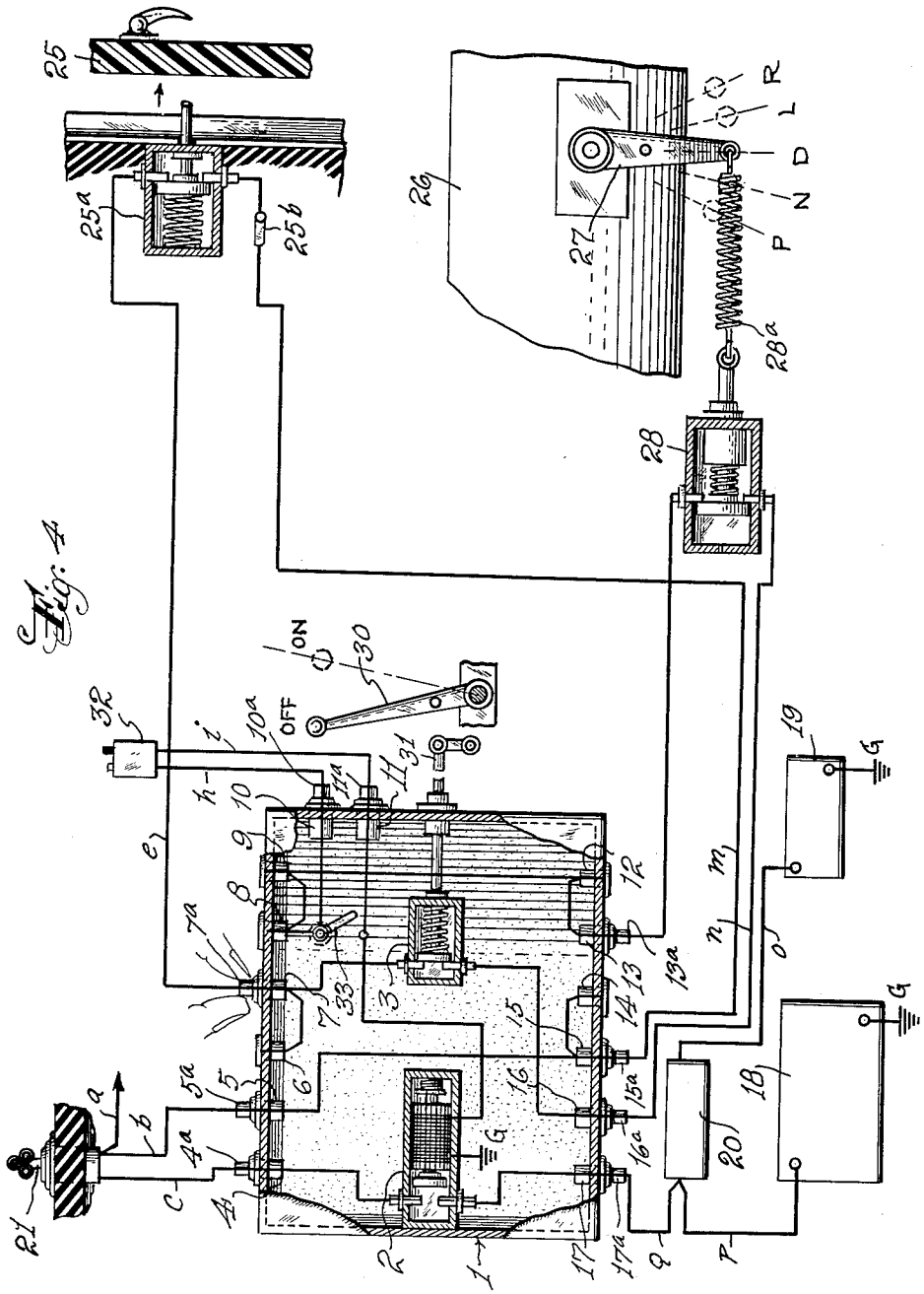

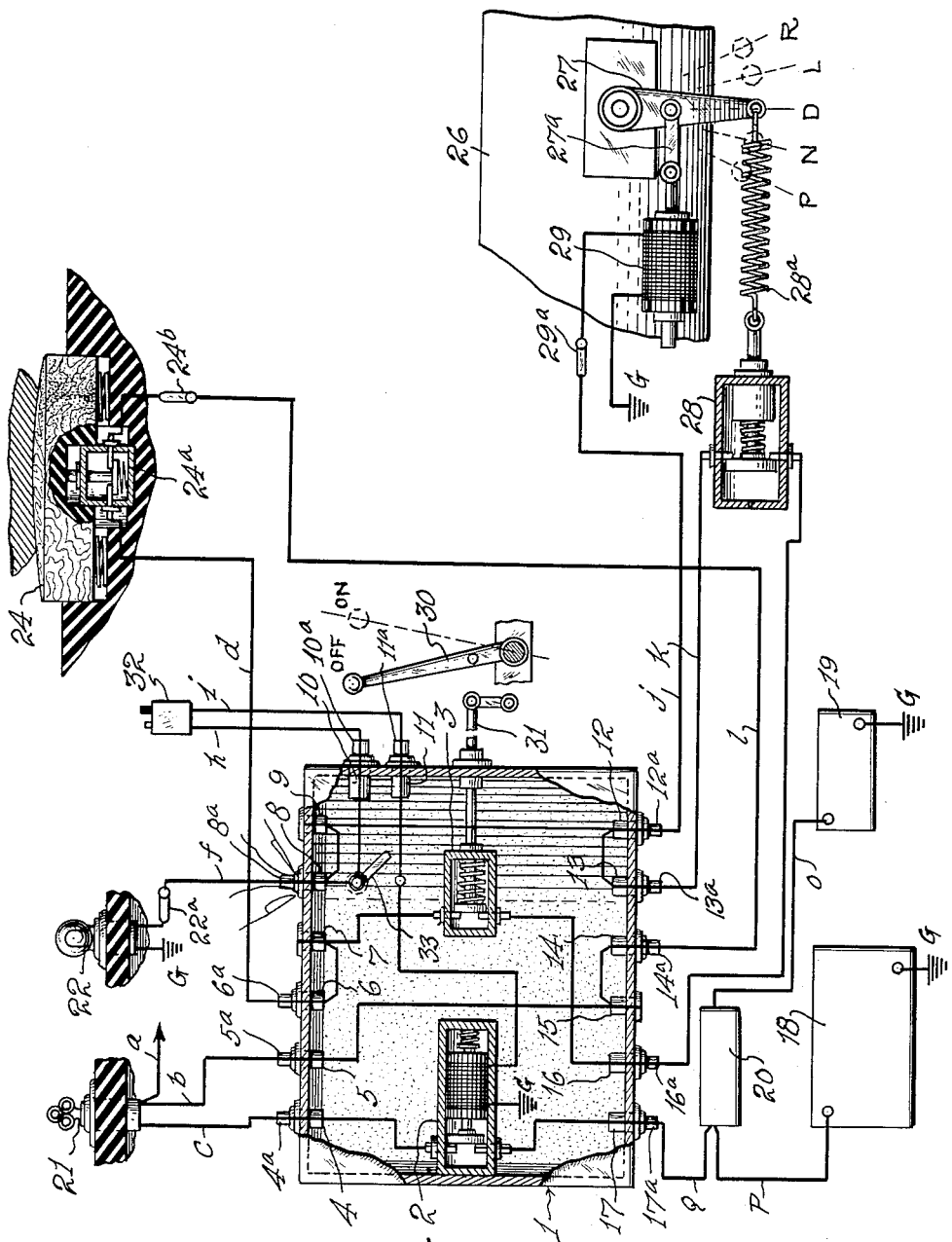

2,740,947

SAFETY METHOD AND MEANS FOR AUTOMOTIVE VEHICLES HAVING AUTOMATIC DRIVES

John W. Davies, Roseland, N. J.

Application October 2, 1953, Serial No. 383,765

5 Claims. (Cl. 340—52)

This invention relates to a new method and means of safety control for automotive vehicles having automatic transmissions. Heretofore no attempts have been made to devise a method and means for securing safety to the occupants of an automotive vehicle having automatic drive transmission when the vehicle has stopped temporarily and the transmission is in drive position.

When such a vehicle is in the condition stated, there is an ever present danger to the occupants, that the vehicle may move, through forgetfulness on the part of the driver, or by some unintentional application of power. For example, there are proven cases in which the driver has forgotten that he has placed the transmission in drive position and has left the vehicle momentarily and another occupant of the vehicle inadvertently applied pressure to the gas pedal. In one instance the occupant thought that she was applying the brake, and in another instance a child pressed the gas pedal.

The general public have been unaware that this ever present danger exists, and it is only through sheer luck that a larger amount of deaths and damages have not resulted.

It is to overcome this extremely dangerous condition, that the present method and means have been invented. The applicant having had long experience in the art of automatic drives has produced this method and means which will fulfill the various conditions required to be met in a method and means for the purpose set forth.

This method and means will be fully understood by referring to the accompanying specification, and drawings in which like parts are designated by like numbers.

In referring now to the drawings:

Fig. 1 is a diagrammatical view showing a complete application of the method and means to an automotive vehicle, having an automatic transmission.

Fig. 2 is a similar view to Fig. 1 showing the same method, but a special selection of means used in said method.

Fig. 3 is a view similar to Fig. 2 but showing another selected set of means.

Fig. 4 is a similar view to Fig. 2 but showing yet another combination of selected means.

Fig. 5 is a similar view to Fig. 2 but showing a further different combination of selected means.

In referring now in detail to the drawings, and especially to Fig. 1, it will be seen that the means herein employed incorporates various units working in conjunction one with another in combinations.

It will be further seen from Fig. 1 that the main units so co-acting include the battery 18, the starter 19, the starter solenoid 20, the ignition switch 21, the transmission 26 and the parking brake 30.

The auxiliary units consisting of the vehicle door 25, preferably on the driver's side, the driver's seat 24, an audible signal 23, a visual signal 22, a transmission switch 28, a selective-lever solenoid 29, an ignition solenoid switch 2, and a parking-brake switch 3, as well as in the preferred form of a junction or control box 1. The various units are electrically connected together by the wires, A to Q inclusive, in connection with the various switches 22a, 23a, 33, 24a—24b, 25a, 25b, 29a, 28, the parking brake switch 2 and the solenoid 29, through the plug contacts, 4 to 17 inclusive, and 4a to 17a inclusive and the mechanical units, 28a and 31.

In Fig. 1 all of the physical features needed to assure proper application of the method are shown, although, as will be seen from Figs. 2 to 5 inclusive only a few may be employed according to the desire of the operator. In Fig. 2 a selection has been made to employ the door 25 and the seat 24, a switch 32, and the hand lever 30.

In Fig. 3, the selection shown includes the door 25, the switch 32, and the audible signal 23. In Fig. 4 the selection is identical to Fig. 3 except it omits the signal 23. In Fig. 5 the selection has included the seat 24, the switch 32 and a visible signal 22. The method consists in creating a condition in which when the automatic transmission is in drive or park position, the ignition will be cut off automatically either through the application of the parking brake or by opening the car door, or by the driver leaving his seat.

In Fig. 2 the selection shown will operate according to the method should the driver open the car door or leave his seat, had the lever 30 been left in off position. As shown in this figure the method has operated through the lever 30. In Fig. 3 the method has operated through the opening of the door 25 and caused a warning signal 23 to sound. In Fig. 4 the same condition exists as in Fig. 3 except no warning signal has been operated. In Fig. 5 the method is applied if the operator leaves his seat and includes a warning light showing the condition existing.

In most of the views the selector lever is not returned automatically to neutral or park. In Fig. 1 this feature is incorporated by employing the solenoid 29, which when the lever 30 is in "off" position and switch 29a is closed, the selective lever is pulled into either neutral or parked position when solenoid 29 is energized.

With reference to Fig. 1, part of the circuits are traced as follows:

The negative terminal of battery 18 is grounded, as shown. Connection from positive terminal of the battery is through wire P, through starter solenoid 20, through wire Q to plug 17a, and thence through the contacts of ignition solenoid switch 2 and through plug 4a and wire C to ignition switch 21. From switch 21, this connection is through wire b and plug 5a to plug 15a.

In Fig. 3, switches 23a and 25b are closed to cause the condition whereat the audible signal 23 will sound if the driver inadvertently attempts to leave the car with ignition switch 21 on, parking-brake lever 30 in the "off" position, and lever 27 in an operating position such as reverse, low, or drive. In the case shown, lever 27 has inadvertently been left in the drive position. At the instant the driver opens door 25 in attempting to leave the car, switch 25a closes to complete the power circuit for signal 23 which sounds and gives him immediate warning that the car is in an unsafe condition. This power is traced as follows:

From positive of the power supply at plug 15a, through wire m and the closed switches 25b and 25a to plug 7a, thence through the closed contacts of the parking-brake switch to plug 16a, through wire n and the closed contacts of switch 28 to plug 13a, thence to contact 12 through the jumper shown, and then to plug 9a and through wire g and switch 23a to the positive side of signal 23. The other side or terminal of signal 23 is grounded, as shown, the same as the negative terminal of battery 18. Signal 23 then sounds for an instant, until the contacts of switch 2 open when the solenoid of this switch is energized. This solenoid is energized with signal 23 because it is parallel-connected with the latter through wire g, plugs 9a and 10a, wire h, the closed switch 32, wire i, plug 11a, and the wire from plug 11a to the positive end of solenoid 2. The solenoid switch thus becomes energized for an instant to open its contacts, whereupon the ignition circuit is opened for an instant sufficient to cause the idling engine to stall. Under the spring pressure, these contacts are closed an instant later to again complete the ignition circuit and cause signal 23 to sound, but this action is not instantaneous enough to permit the engine to pick up again, or to continue idling. With signal 23 emitting repeated warnings, the driver is alerted to make one or all of the following three safety corrections. The ignition switch 21 is opened to open the ignition circuit, the lever 27 is moved to the neutral or parking position to open switch 28, or lever 30 is moved to the "on" position whereat the parking brakes are applied and the parking-brake switch 3 is opened to cut signal 23 and to deenergize solenoid 2.

If the driver wishes to make effective the automatic action shown in Fig. 1 for lever 27, he opens switch 24b and closes switches 25b and 29a. Assuming that he has done this, and then with lever 30 inadvertently left "off" and lever 27 inadvertently left in the drive position as shown in Fig. 3, and also with ignition switch 21 inadvertently left on, he attempts to leave the car by opening door 25. In such case, solenoid 29 instantly becomes energized to pull lever 27 into the neutral position N or into the park position P. The energizing circuit for such action was through the closed switch 29a to plugs 12a and 13a, through wire k, through switch 28 which was closed at the time as shown in Figs. 2 and 3, through wire n to plug 16a, through switch 3 to plug 7a, through wire e, through switches 25a and 25b, and through connection m to plug 15a.

Considering one of the broader aspects of my invention, this is believed to reside in the following combination or arrangement of parts and circuits forming part of or incorporated in an automatic drive for automotive vehicles such as the so-called Fordomatic and Mercomatic drives. The usual transmission-selection member 27 is supported and disposed for movement selectively into different positions. At least one of these positions, i. e., D or L or R, is an operating position and at least one, i. e., P or N, is a non-operating position. There is a control circuit which is traced, in Fig. 3, as follows: From the engine-ignition switch 21 through connection b to plug 5a, thence to plug 15a and through connection m, switch 25b and connection e to plug 7a, through the park-brake switch 3 to plug 16a and thence through connection n, switch 28 and connection k to plug 13a, across the jumper shown to contacts 12, 9 and 8, and through connection h, switch 32 and connection i to contact 11 and the positive end of the coil of relay 2. Included in this control circuit is switch means 28 arranged, as shown, to be closed when member 27 is in any one of its operating positions D, L and R and to be opened when member 27 is in either one of its non-operating positions P and N. There is an engine-ignition circuit which is traced, in Fig. 3, as follows: From battery 18 through connections P and Q to contact 17, and thence to contact 4 and through connection C to connection a. In this engine-ignition circuit there is connected the engine-ignition switch 21, as shown. The relay 2 which is normally closed by spring pressure, as indicated, comprises the coil connected in the engine-ignition circuit in series relation with respect to the engine-ignition switch 21. The battery or electrical power-supply source 18 is associated with the control circuit to energize the coil of relay 2 upon completion of the control circuit. The door 25 and switch 25a constitute, broadly, means associated with the control circuit for effecting completion thereof only under conditions whereat both the engine-ignition switch 21 and the switch means 28 are closed.

Having thus described my method and means in detail, although I have shown only a few of the combinations and details which constitute the means I employ to accomplish my method it is to be understood I may make various minor changes therein and not depart from the spirit of the invention and all of the claims should be read in the light thereof.

What I claim is:

1. In a motor vehicle having a door, a transmission-selective member supported and disposed for movement selectively into different positions, at least one of said last-named positions being an operating position, at least one of said last-named positions being a non-operating position, an engine-ignition circuit, a source of electrical power for said circuit, and an ignition switch associated with said circuit and disposed in and with respect to said circuit in such manner as to control the same; an electrically-operated switch having its contacts connected in said engine-ignition circuit, switch means associated with said door and having a closed position and an open position and being associated with and disposed with respect to said door in such wise as to be moved from said open position thereof into said closed position thereof incidental to opening movement of said door, second switch means series-connected with said first-named switch means and associated with said member and having a closed position and an open position and being associated with and disposed with respect to said member in such wise as to be held in said closed position thereof when said member is in said operating position thereof, and electrical connection means including said first-named switch means and said second switch means and constituting therewith and with said power source an electrical circuit, said electrically-operated switch being associated with said last-named circuit and disposed in and with respect thereto in such wise as to become energized and thereby opened upon the closing of said first-named switch means.

2. In a motor vehicle having a door member, a transmission-selective member supported and disposed for movement selectively into different positions, at least one of said last-named positions being an operating position, at least one of said last-named positions being a non-operating position, an engine-ignition circuit, a source of electrical power for said circuit, and an ignition switch associated with said circuit and disposed in and with respect to said circuit in such manner as to control the same; switch means associated with said door and having a closed position and an open position and being disposed with respect to the latter in such wise as to be moved from said open position thereof into said closed position thereof incidental to opening movement of said door, electrical connection means including said switch means and constituting therewith and with said power source an electrical circuit, and an electrical component associated with said last-named circuit and disposed in and with respect thereto in such wise as to be activated upon the closing of said switch means, said component being connected to said transmission-selective member and being effective when activated to impart to the latter movement out of said operating position thereof.

3. In an automatic drive for automotive vehicles, a transmission-selection member supported and disposed for movement selectively into different positions, at least one of said positions being an operating position, at least one of said positions being a non-operating position, a control circuit including switch means arranged to be closed when said member is in said operating position thereof and to be opened when said member is in said non-operating position thereof, an engine-ignition circuit, an engine-ignition switch connected in said engine-ignition circuit, a normally-closed relay comprising a coil connected in said control circuit and contacts connected in said engine-ignition circuit in series relation with respect to said engine-ignition switch, an electrical power-supply source associated with said control circuit to energize said coil upon completion of said control circuit, and means associated with said control circuit for effecting completion thereof only under conditions whereat both said engine-ignition switch and said switch means are closed.

4. In an automatic drive for automotive vehicles, door structure forming part of said vehicle, a transmission-selection member supported and disposed for movement selectively into different positions, at least one of said positions being an operating position, at least one of said positions being a non-operating position, a control circuit including switch means arranged to be closed when said member is in said operating position thereof and to be opened when said member is in said non-operating position thereof, an engine-ignition circuit, an engine-ignition switch connected in said engine-ignition circuit, a normally-closed relay comprising a coil connected in said control circuit and contacts connected in said engine-ignition circuit in series relation with respect to said engine-ignition switch, an electrical power-supply source associated with said control circuit to energize said coil upon completion of said control circuit, and means associated with said structure and with said control circuit for effecting completion thereof only under conditions whereat both said engine-ignition switch and said switch means are closed and a predetermined movement is imparted to said structure.

5. In an automatic drive for automotive vehicles, seat structure forming part of said vehicle, a transmission-selection member supported and disposed for movement selectively into different positions, at least one of said positions being an operating position, at least one of said positions being a non-operating position, a control circuit including switch means arranged to be closed when said member is in said operating position thereof and to be opened when said member is in said non-operating position thereof, an engine-ignition circuit, an engine-ignition switch connected in said engine-ignition circuit, a normally-closed relay comprising a coil connected in said control circuit and contacts connected in said engine-ignition circuit in series relation with respect to said engine-ignition switch, an electrical power-supply source associated with said control circuit to energize said coil upon completion of said control circuit, and means associated with said structure and with said control circuit for effecting completion thereof only under conditions whereat both said engine-ignition switch and said switch means are closed and a predetermined movement is imparted to said structure.

References Cited in the file of this patent

UNITED STATES PATENTS

| | | |
|---|---|---|
| 2,182,426 | Courcier, Sr. | Dec. 5, 1939 |
| 2,349,740 | McCollum | May 23, 1944 |
| 2,581,338 | La Roza | Jan. 8, 1952 |
| 2,584,938 | Sweeny et al. | Feb. 5, 1952 |
| 2,613,258 | Azano | Oct. 7, 1952 |
| 2,634,400 | Sweet | Apr. 7, 1953 |